UNITED STATES PATENT OFFICE 2,290,111

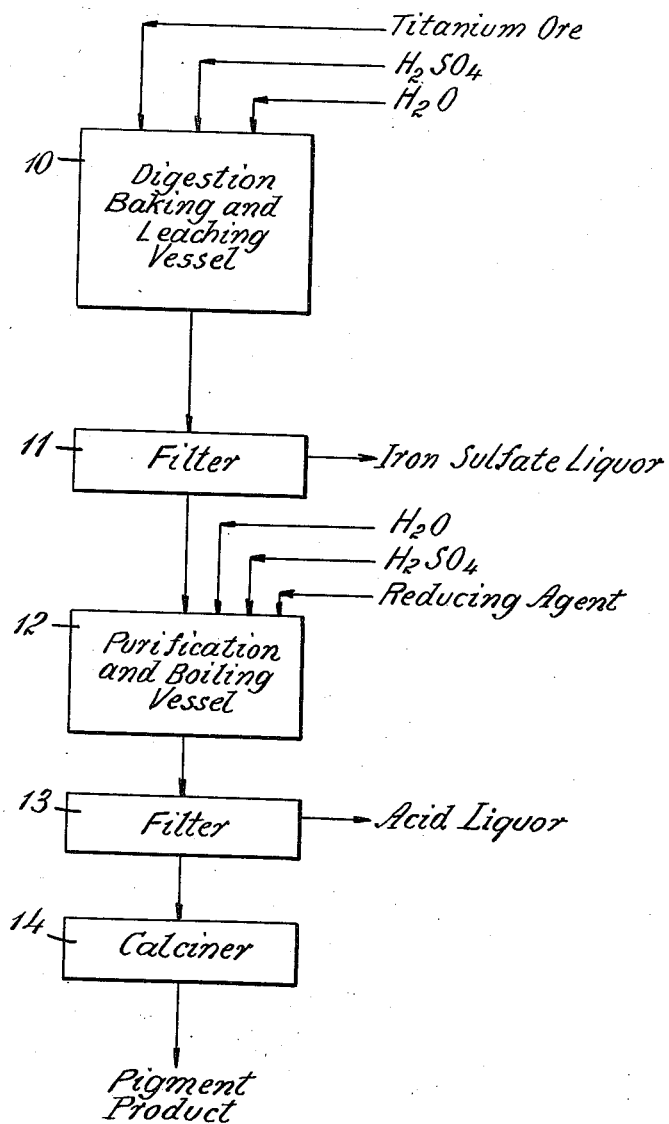

PRODUCTION OF TITANIUM OXIDE

Henry F. Merriam, West Orange, N. J., and Maxwell J. Brooks, New York, N. Y., assignors to General Chemical Company, New York, N. Y., a corporation of New York Application April 20, 1939, Serial No. 269,042

5 Claims. (Cl. 23—202)

This invention relates to the manufacture of titanium oxide pigments.

In the usual prior methods for making titanium oxide pigments of commercial grade, ilmenite is digested with sulfuric acid to form a solid mass comprising titanium sulfate, ferrous and ferric sulfates, and some variable amounts of undigested ore and gangue. The cake is leached with water to form a solution consisting chiefly of titanium sulfate, and ferrous and ferric sulfates. The liquor is treated to reduce ferric sulfate to ferrous sulfate, clarified and filtered, and boiled to hydrolytically precipitate water insoluble titanium compound in the form of metatitanic acid. The precipitate is filtered out, washed, usually purified to remove associated $SO_3$, and calcined at temperatures of 800–1000° C. to convert the crude metatitanic acid to titanium oxide having pigment properties.

Prior methods of this general type involve many objectionable features chief among which is the generally complicated nature of the procedure including many separate steps and requiring large expenditures for plant construction, maintenance and operation. While some of the major phases such as digesting the ore with sulfuric acid present no particular difficulties, other parts of the operation such as hydrolysis must be very closely controlled and even then uniformity of final product is difficult to obtain. Other important objections include the necessity for handling large volumes of relatively dilute liquors and high loss of soluble titanium. Another substantial disadvantage is that practically all of the iron of the ore is recovered as ferrous sulfate, a by-product of little or no commercial value.

The principal object of the present invention is to provide a method for the manufacture of titanium oxide pigments of commercial grade by procedure relatively simple as compared with common practice. The invention may be understood from consideration of the following description taken in connection with the accompanying flow sheet.

The process of the present invention may be generally outlined as follows. Titanium ore such as ilmenite is digested in vessel 10 with sulfuric acid to form an initial, relatively cake-like digest mass in which titanium and iron are principally in the form of water soluble sulfates. The mass is then heated or baked in vessel 10 preferably gradually to relatively high temperatures, but not exceeding a given maximum, to convert the water soluble titanium to a titanium oxygen compound, probably all titanyl sulfate. Heating is conducted so that the titanyl sulfate is not appreciably decomposed to metatitanic acid and so that basic ferric iron associated with the titanium is not converted to a form so highly basic as to prevent subsequent separation of iron from the titanium compound. The product of this heating operation is a soft, frangible cake comprising chiefly titanyl sulfate, ferric sulfate, some ferrous sulfate and some water insoluble basic ferric sulfate more or less bound up with the titanium. The mass is leached preferably in vessel 10 with water under conditions as to separate from the solid titanium as much water soluble ferrous and ferric sulfate as feasible, and to avoid any appreciable decomposition of titanium compound by the leaching liquor. In this way most of the associated iron is washed out and there is produced a solid easily filterable titanyl sulfate contaminated with a small amount of basic iron sulfate, and a liquor containing say 85% or more of the total iron of the original ore and a relatively small amount of soluble titanium. The titanium oxide compound, after separation from the liquor by filtration in filter 11, is subjected while in vessel 12 to a hereinafter described purification treatment by means of which the titanyl sulfate is converted to metatitanic acid and basic ferric sulfate still associated with titanium is removed to a degree such that the product, after calcination, is a titanium oxide of pigment grade.

In practice of the invention, the titaniferous materials preferred for digestion with sulfuric acid are those in which not less than about 70% of the total iron is in the ferric form. During digestion of ore and acid, it is thought that in the presence of heat some complex reaction taking place between ferrous iron and titanium sulfate compounds tends to convert some titanium into a permanently water soluble form. Whatever the reasons may be, indications are that in the absence of use of an oxidizing agent during digestion (to oxidize ferrous iron to ferric), best results and most satisfactory overall yields of titanium are obtained when the ore digested with sulfuric acid contains preferably not less than about 70% of the total iron in the ferric condition.

In order to obtain most satisfactory ore decomposition and titanium yields, and further to provide in the mass a certain amount of sulfuric acid available for a subsequently discussed oxidation of ferrous iron to ferric, it is preferred to use in the initial acid-ore digest an amount of sulfuric acid in excess of the quantity theoretically required to convert titanium of the ore to the normal disulfate. Generally stated, ore and acid are digested in proportions of about one part of ore to 2–2.5 parts by weight of $H_2SO_4$ which may be used in the form of 60 or 66° Bé. acid.

Sulfuric acid and ore, preferably finely divided say 100 to 300 mesh, are charged into an open top vessel 10, which may be of any satisfactory design and construction, provided with suitable equipment by means of which material in the vessel may be controllably heated by extraneous heat. Although initial reaction of ore and acid is largely exothermic it is preferred if necessary to apply extraneous heat to raise and maintain the mass at temperatures from about 175° C. to about 200° C. During digestion stage heating, which may continue for say an hour, probably all of the titanium oxides of the ore are converted to normal sulfates and the resultant mass is in the form of a relatively soft cake.

Some ores are more refractory than others and are less easily decomposed by sulfuric acid. In such instances to secure best titanium yields and insure substantial absence of undecomposed ore it is preferred to break up the cake and slurry the same with an additional quantity of sulfuric acid which may amount to about 30% of the acid used in the initial ore-acid digest. This supplementary sulfuric acid treatment is not necessary, but preferably is employed to minimize presence of undecomposed ore in the final product.

The cake resulting from the initial ore-acid digest, or the relatively thick mass resulting from slurrying such cake with additional sulfuric acid, is then subjected while in vessel 10 to further baking or heating and the temperature of the mass increased from about 200° C. to about 300° C. By the time temperature reaches about 225° C., normal titanium disulfate $Ti(SO_4)_2$, begins to decompose to titanyl sulfate $TiO(SO_4)$, and decomposition progresses as temperature rises. As previously mentioned, indications are that in presence of ferrous iron some of the titanium in the mass is converted to or is retained in permanently water soluble form. Since water soluble titanium is taken up in the subsequently described water leaching and purification stages, it is desirable to have as much as possible of the iron in the mass in the ferric state. When the temperature of the mass is raised to about 275° C. oxidation of ferrous iron by free sulfuric acid commences. Hence, in order to reduce the presence of ferrous iron to a minimum it is desirable to use in digestion of the ore an excess of sulfuric acid so that appreciable quantities of acid will be present during heating of the mass at temperatures around 275–300° C. to bring about oxidation of ferrous iron to ferric. Heating of the mass at temperatures of around 300° C. may be continued for about an hour, and over a subsequent period say two hours temperatures are increased to not more than about 500° C. It will be understood that for the baking step, carried out at temperatures much higher than the digestion operation, the heat needed is supplied from extraneous sources.

It is recognized in the art that the presence of appreciable iron affects the color and the pigment value of titanium oxides. In usual commercial practice and also in the present process the final titanium oxide pigment is obtained by calcining metatitanic acid at temperatures of the order of 800–1000° C. Once any considerable amount of titanium oxygen compound, containing iron especially as basic ferric sulfate, is converted to metatitanic acid, associated iron changes to a form so highly basic that it cannot be removed by usual chemical methods, and hence color is affected and pigment value of the final titanium oxide is materially reduced. In accordance with this invention it is found that by digesting iron containing titaniferous materials with sulfuric acid, and heating the mass to temperatures not in excess of about 500° C. but high enough to drive off free sulfuric acid, i. e. acid not combined with bases or with titanium as $TiOSO_4$, titanium of the ore may be converted, in what for practical purposes may be considered a one-step operation, to predominantly titanyl sulfate, and practically all of whatever basic ferric sulfate may be associated with the titanyl sulfate is in a form amenable to removal by purification methods to be subsequently described. By regulating temperatures so as not to exceed 500° C., decomposition of titanyl sulfate to metatitanic acid is prevented and at the same time conversion of associated basic ferric sulfate to a form too basic and of a character which cannot be removed by purification is avoided.

During final heating, temperatures of the mass need not necessarily be raised to 500° C. However, heating should be carried on at temperatures and for a time interval long enough to drive off from the mass all free sulfuric acid. In order to obtain adequately complete reactions and minimize presence of water soluble titanium in the cake, the final heating operation should be carried out at temperatures not less than about 300° C. While heating from about 225° C. upward, it will be understood the normal titanium sulfate $Ti(SO_4)_2$ is being converted to titanyl sulfate $TiO(SO_4)$ by splitting off of $SO_3$. The end point of the heating operation may be determined by the absence of visible fumes given off by the cake. At this stage, the mass is a dry, light colored cake comprising solid titanyl sulfate, possibly some water soluble ferrous sulfate, a substantial amount of water soluble ferric sulfate, and some basic ferric sulfate more or less firmly bound up with the titanyl sulfate as a complex salt. By applying the principles of the invention, this basic ferric sulfate is held in a condition of such form and character that it may be removed by a comparatively simple and easily carried out purification operation. Thus, by limiting heating temperatures as described and by avoiding to any appreciable extent decomposition of titanyl sulfate to metatitanic acid, the basic ferric sulfate though tied up in substantial amounts with the titanyl sulfate is still in a readily removable form and does not become converted to a condition not susceptible to removal by chemical treatment.

The heating operation has been described for convenience as digestion and baking steps carried out at different temperatures. It will be evident that the heating is in effect a one-step operation carried out at temperatures gradually increasing so as to afford reactions effected at certain temperatures sufficient time to proceed smoothly.

For purposes of first avoiding use of excessive amounts of reducing agent in the subsequent purification operation, and second to permit recovery of most of the iron content of the ore in the form of ferric sulfate, preferably the cake resulting from the baking operation is subjected to a water leaching operation. Leaching is carried out preferably in vessel 10 under conditions so as to first recover water soluble iron chiefly as ferric sulfate; second, to avoid as far as feasible dissolving of titanium in the leach liquor; and third, to prevent conversion of titanyl sulfate ($TiOSO_4$) to metatitanic acid with attendant change of the easily removable basic iron sulfate to a more difficultly removable form. The reason for such precaution is that any titanium taken up by leach liquor is lost and the overall yield of the process is cut down. Further, conversion of any appreciable amounts of titanyl sulfate to metatitanic acid in the presence of basic ferric sulfate disturbs those basic ferric sulfate characteristics which render the iron readily removable and changes the form of the basic ferric sulfate to one so highly basic as to prevent substantially complete removal of iron in the subsequent purification operation. To accomplish these aims, water is introduced into vessel 10 and the cake is leached by agitating preferably with an amount of water for example 1 to 1.2 parts of water by weight per part of the cake at about temperatures preferably about 60–70° C. and not in excess of 80° C. By so proceeding, there is obtained a neutral or slightly basic liquor containing for example 85% or more of the total iron of the ore as ferric sulfate and also variable amounts of titanium sulfate. The bulk of the titanium remains in solid condition as a white flocculent and easily filterable titanyl sulfate containing a small amount of basic iron sulfate and small amounts of substances such as silica contained in the initial ore. The mass is run out of vessel 10 and titanyl sulfate is filtered out in filter 11 and is ready for purification to remove basic ferric sulfate. One of the economic advantages of the invention is that the leach liquor contains most of the iron of the ore as ferric sulfate. The liquor discharged from filter 11 may be concentrated and ferric sulfate recovered in the form adaptable for use in the water purification operations. In the common prior methods, iron is recovered as ferrous sulfate which has little or no market value.

The following is a specific illustration of preparation of titanyl sulfate from a high ferric ilmenite.

*Example 1.*—Ilmenite ore comprising 52.8% $TiO_2$, 7.1% FeO, 28.5% $Fe_2O_3$ (78.4% of the total iron in ferric state) was digested at atmospheric pressure with 60° Bé. $H_2SO_4$ in amount equivalent to 118% of that required to convert the titanium oxides of the ore to normal titanium sulfate. The slurry was heated at 175–200° C. for about an hour and there was obtained a soft, brown colored cake. Temperature was then raised to 275–300° C. for about an hour, raised to about 400° C. for another hour, and then finally to 500° C. for another hour, driving off free $H_2SO_4$. The cooled cake was a dry, light gray sandy mass. On leaching with 1 to 1.2 parts of water per part of cake at temperatures ranging from about 70° to not more than 80° C. a nearly neutral or slightly basic liquor containing about 88% of the total iron of the ore as ferrous and ferric sulfate, and about 17% of total titanium content of the ore as titanium sulfate was obtained. The titanyl sulfate was a white, easily filterable material and after separation from the liquor comprises about 45% $TiO_2$, 0.6% FeO, 3.5% $Fe_2O_3$ and 48.1% $SO_3$. In this example, the yield of titanium was about 83% of the titanium content of the original ore.

As previously indicated, it is preferred to use in the digestion operation a titaniferous material in which at least about 70% of the total iron is in the ferric condition. In several types of ilmenite ore of the total iron present, iron in the ferrous state predominates. When using such ores in the present process, it is preferred to subject the ore to a preliminary calcination at temperatures ranging from say 700 to 900° C. under oxidizing conditions and for a period of time sufficient to convert most of the total iron, say 98%, to ferric state. In this way an appreciably greater titanium yield is obtained in the digestion operaiton.

The following specific procedure illustrates use of an initially high ferrous ilmenite oxidized by roasting in air prior to digestion with sulfuric acid, and also exemplifies practice of the digestion operation when the mass is not heated as high as 500° C.

*Example 2.*—Ilmenite ore of which only 37% of the total iron was in the ferric state was oxidized by roasting in air at 750–800° C. until about 98% of the total iron content was present as ferric oxide. The calcined ore was digested at atmospheric pressure with 60° Bé. $H_2SO_4$ in amount equivalent to 110% of that required to convert the iron and titanium oxides of the ore to normal sulfate. The slurry was heated to about 200° C. for about an hour. The temperature was then raised to about 300° C. and maintained at that point for about 3 hours. The cooled cake was leached with 1 to 1.2 parts of water per part of cake at temperatures ranging from about 70° to not more than 80° C. The resulting liquor contained about 11% of the total titanium of the ore, and about 88% of the total iron of the original ore. About 98% of the iron in the liquor was in the ferric state. After separation from the liquor the titanyl sulfate obtained comprises about 43.8% $TiO_2$ and about 4.5% $Fe_2O_3$. In this example, the yield of titanium was about 88% of the titanium content of the original ore.

When using relatively high ferrous iron ores, instead of calcining the ore as in Example 2, it may be desirable to carry out the digestion operation in the presence of sufficient oxidizing agent to substantially oxidize the ferrous iron to ferric. The following illustrates this alternative procedure.

*Example 3.*—A given weight of ilmenite ore assaying 57.2% $TiO_2$, 16.2% FeO, and 22.4% $Fe_2O_3$ (about 55% of total iron present as ferric oxide) was mixed with 66° Bé. sulfuric acid in amount equivalent to about 110% of that needed to convert titanium oxides of the ore to normal titanium sulfate. About 1.42 parts by weight of $HNO_3$ as 60% nitric acid was added to charge, the water in the $HNO_3$ being sufficient to dilute 66° Bé. $H_2SO_4$ to 60° Bé. The slurry was digested for one hour at 200° C., then heated at 300° C. for another hour, and finally heated at around but not higher than 500° C. for 3 hours. The cake was then leached with 1–1.2 parts by weight of water. Leach liquor contained about 88% of the iron content of ore (97% of the iron in the liquor was present as ferric sulphate), and about 7.5% of the titanium content of ore. The leached basic titanyl sulphate contained about 4.3% $Fe_2O_3$, and about 47% $TiO_2$, the yield being about 92.5% of the titanium content of ore.

The leached products of the above examples are next subjected to purification to remove iron.

The leached titanyl sulfates comprise upwards of 40% $TiO_2$ and usually more than 45% $SO_3$, and are contaminated with iron, generally more than 3% $Fe_2O_3$ in the form of basic ferric sulfate. If such titanyl sulfates were converted to metatitanic acid and calcined in the usual way the resulting pigments would be so high in iron as to be of no commercial value as a white pigment. In the preferred embodiments of the invention, the leached titanyl sulfate products are purified while in the solid phase to remove iron, but without changing the titanium oxygen compound to the form of soluble titanium sulfate. It has been found that when the titanyl sulfate is made by the previously described heating operations, ferric iron though tied up with the titanium in substantial amounts as a complexly associated basic ferric sulfate may be reduced and converted to a water soluble form prior to or simultaneously with conversion of titanyl sulfate to metatitanic acid. Basic ferric sulfate of itself is not readily soluble in water or even in sulfuric acid of fair strength, e. g. 30%. The developments upon which the invention is based show that when leached titanyl sulfate was boiled for 2 hours in a 30% $H_2SO_4$ solution it was possible to convert less than half the iron to water soluble form, and at the same time about half of the titanium was also changed to soluble form. Nevertheless, although only difficultly and incompletely soluble in fairly strong acid, we have discovered a means by which the basic ferric sulfate associated with the titanyl sulfate may be easily converted to ferrous condition and rendered water soluble and thus readily separable from the titanyl sulfate. We have found this end may be accomplished by treating the titanyl sulfate with a water solution containing reducing agent sufficiently powerful to reduce the ferric iron to ferrous condition. We have also found that conversion of basic ferric sulfate to ferrous condition should be effected prior to or simultaneously with conversion of the titanyl sulfate to the metatitanic acid form.

When carrying out the purification operation, the leached titanyl sulfate cake from filter 11 is mixed, in purification vessel 12 preferably equipped with boiling coils with sufficient water to form a relatively thin slurry to which is added a reducing agent in amount equivalent to or preferably slightly in excess of that theoretically required to reduce the ferric iron of the titanyl sulfate to the ferrous state. The mass may be agitated at normal temperatures and the basic ferric iron converted to water soluble form. However, to make the purification operation more practicable it is preferred to boil the slurry, the higher temperatures facilitating change of the basic ferric sulfate to water soluble form and at the same time causing conversion of the titanyl sulfate to metatitanic acid. Furthermore, it has been found that removal of basic ferric iron, conversion of titanyl sulfate to metatitanic acid are accomplished and a much better final product obtained where the titanyl sulfate is boiled in a weak sulfuric acid solution. While use of the acid solution does not appear to be critical with respect to change of basic iron sulfate to water soluble condition, for some unexplained reason the ultimate product obtained is a higher grade when a weak acid solution of $H_2SO_4$ concentration of not more than 23% is used.

Any suitable reducing agent such as strong reducing gases, or metals such as zinc, aluminum or iron, or a reducing salt such as titanous sulfate $Ti_2(SO_4)_3$ may be used. The slurry is boiled for a substantial period of time depending more or less upon the size of the batch and the quantity of ferric iron contained in the sulfate. During the boiling operation the iron is reduced to the ferrous state, becomes soluble and goes into solution as ferrous sulfate. Titanyl sulfate is converted in the solid phase to metatitanic acid liberating $SO_3$ which is dissolved in the solution to form sulfuric acid. The purified metatitanic acid, after separation from the liquor, as by filter 13, and washing substantially free of soluble salts, contains less than 0.05% ferric iron as $Fe_2O_3$. The metatitanic acid may also contain say 3 to 5% of $SO_3$ which may be removed by treatment in accordance with known procedure for example as in Jebson U. S. Patent 1,361,867 of December 20, 1920. The purified metatitanic acid washed free of soluble salts is then calcined in retort 14 at temperatures of about 800–1000° C. in accordance with customary practice to convert the metatitanic acid to pigment form.

Following are examples of purification of titanyl sulfate:

*Example 4.*—Leached basic titanyl sulfate containing about 3.5% $Fe_2O_3$ and about 43.2% $TiO_2$ was boiled for 2 hours in 10% $H_2SO_4$ to which sufficient $Ti_2(SO_4)_3$ to reduce the $Fe_2O_3$ had been added. The metatitanic acid was filtered out of the liquor, washed free of soluble iron, and dried at 100° C. The dried product, containing over 90% of total titanium content of titanyl sulfate and of the $Ti_2(SO_4)_3$ reducing agent analyzed 0.05% $Fe_2O_3$, 77.8% $TiO_2$, and 1.2% $SiO_2$. The dried purified oxide when calcined at temperatures of 800–1000° C. produced a pigment of white color, good tinting strength and covering power.

*Example 5.*—Leached titanyl sulfate containing 8.9% $Fe_2O_3$ and 42.6% $TiO_2$ was boiled in 19% $H_2SO_4$ solution for 2 hours in the presence of sufficient titanous sulfate to reduce ferric iron to ferrous. After filtration, washing out of soluble iron, and drying at 100° C., the product contained 75.9% $TiO_2$ and 0.02% $Fe_2O_3$.

In accordance with the procedure described, the titanyl sulfate product of the heating operation is leached with water primarily for the purpose of recovering most of the iron of the original ore as ferric sulfate, and secondarily to avoid the use of a relatively large amount of reducing agent in the purification operation. In practice, there may be instances where for some reason there is no particular advantage in recovering the iron as ferric sulfate. In this situation the water leaching and accompanying filtration steps may be omitted, and the titanyl sulfate cake produced by the heating operation is introduced directly into a weak say 5% $H_2SO_4$ solution in quantity to make a thin slurry. On introduction of the mass into this liquor the ferric and ferrous sulfates dissolve and the resultant mass comprises titanyl sulfate and associated basic ferric sulfate in solid form, and ferrous and ferric sulfate, predominantly the latter, in solution. Ferric sulfate in solution is first reduced to ferrous, and for this purpose the slurry may be gassed with $SO_2$ in quantity and for a time interval sufficient to reduce most of the iron in solution to the ferrous condition. During gassing, the solution becomes slightly more acid on account of reduction of ferric sulfate, and with this in mind the acidity of the initial solution should be such that at the time the blowing with $SO_2$ is completed the acidity of the solution is not more than about 23% $H_2SO_4$. At this stage a more powerful reducing agent such as metallic zinc, aluminum, or iron, or preferably titanous sulfate is added in quantity to complete reduction of whatever ferric iron may still be in solution and to provide for reduction to the ferrous condition of the basic ferric sulfate associated with the solid titanyl sulfate. The resultant mass is then boiled as previously described, iron of the basic ferric sulfate is converted to soluble form, most of the $SO_3$ associated with the titanyl sulfate is liberated, and the titanyl sulfate is converted to metatitanic acid which is filtered out, washed, treated for removal of remaining associated 3–5% of $SO_3$, and calcined as before.

In the purification method described, titanyl sulfate is purified in the solid phase without dissolving. There may be instances where, for example on account of a relatively high gangue content in the original ore, it is desirable to separate such gangue from the titanium. As indicated in the discussion of the previously described purification operation, treatment of the titanyl sulfate cake with aqueous liquor containing reducing agent in quantity to reduce the contaminating basic iron sulfate renders the basic ferric sulfate readily soluble in the aqueous liquor. It has additionally been found that similar reducing conditions materially increase the solubility of the titanium of the titanyl sulfate cake. For example, where a leached titanyl sulfate cake was boiled in 30% sulfuric acid for about 2 hours a little less than half of both the iron and the titanium were dissolved and passed into solution. However, it has been found that when there is added to the purification liquor a reducing agent, for example titanous sulfate, in quantity to reduce basic ferric sulfate of the cake to ferrous state and the acid strength of the solution is increased slightly, not only does the basic ferric sulfate become readily soluble but also the solubility of the titanium is greatly increased. For example, where a leached titanyl sulfate cake analysed 42.7% $TiO_2$ and about 4.8% $Fe_2O_3$ was boiled in a 35% $H_2SO_4$ solution containing a reducing agent such as titanous sulfate in amount to reduce the basic ferric sulfate to ferrous sulfate, about 97.7% of the titanium and practically 100% of the iron content of the leached cake were dissolved.

Accordingly, where the original ore is high in gangue and it is desirable to separate the same from the titanium, the titanyl sulfate cake may be boiled in a relatively weak solution of $H_2SO_4$ concentration of not in excess of about 40% with a sufficient reducing agent to reduce the basic ferric sulfate of the cake to ferrous sulfate, and most of the titanium and iron go into solution as titanium sulfate and ferrous sulfate. The liquor thus obtained may be separated from residual solid matter by decantation, clarified and the titanium hydrolyzed by boiling as known in the art. In this operation, the solution from which the titanium is hydrolytically precipitated to form metatitanic acid is very low in iron and contains not more than about 10–12% of the iron of the original ore. Hence, this procedure has the advantage of making possible hydrolytic precipitation of metatitanic acid in the presence of a very small amount of iron with the result that iron contamination of the metatitanic acid is minimized. The metatitanic acid may be purified to remove associated $SO_3$, washed free of soluble salts, and calcined.

The purification method disclosed herein is also described in our copending application Serial No. 269,043, filed April 20, 1939.

We claim:

1. The method for making titanium-oxygen compound which comprises digesting at elevated temperature titaniferous material, containing iron at least about 70% of which is in the ferric state, with sulfuric acid in amount in excess of that needed to convert titanium of said material to the disulfate whereby to form an initial digest mass in which acid reacted titanium and iron are principally in the form of water soluble sulfates, baking the digest mass by extraneous heating at temperatures within the range of not less than about 300° C. and not exceeding 500° C. for substantial time interval sufficient to expel substantially all of the free sulfuric acid whereby to form a solid baked cake in which the bulk of the acid reacted titanium is in the form of water insoluble sulfate, treating the baked cake at temperatures not more than about 80° C. with water in quantity to leach out water soluble iron sulfate, separating from the iron sulfate liquor residual solid titanium sulfate compound having ferric sulfate associated therewith, forming an aqueous mixture of said compound, boiling said mixture in the presence of reducing agent in amount sufficient to reduce ferric iron of said compound to the ferrous state whereby to convert titanium to solid titanium-oxygen compound, and separating residual solid titanium-oxygen compound from the liquor.

2. The method for making titanium-oxygen compound which comprises calcining iron containing titaniferous material by heating under oxidizing conditions to convert at least 70% of the total iron to the ferric state, digesting the calcined material at elevated temperature, with sulfuric acid in amount in excess of that needed to convert titanium of said material to the disulfate whereby to form an initial digest mass in which acid reacted titanium and iron are principally in the form of water soluble sulfates, baking the digest mass by extraneous heating at temperatures within the range of not less than about 300° C. and not exceeding 500° C. for substantial time interval sufficient to expel substantially all of the free sulfuric acid whereby to form a solid baked cake in which the bulk of the acid reacted titanium is in the form of water insoluble sulfate, treating the baked cake at temperatures not more than about 80° C. with water in quantity to leach out water soluble iron sulfate, separating from the iron sulfate liquor residual solid titanium sulfate compound having ferric sulfate associated therewith, forming an aqueous mixture of said compound, boiling said mixture in the presence of reducing agent in amount sufficient to reduce ferric iron of said compound to the ferrous state whereby to convert titanium to solid titanium-oxygen compound, and separating residual solid titanium-oxygen compound from the liquor.

3. The method for making titanium-oxygen compound which comprises digesting at elevated temperature iron containing titaniferous material with sulfuric acid in amount in excess of that needed to convert titanium of said material to the disulfate and in the presence of sufficient oxidizing agent to convert at least 70% of the total iron to the ferric state whereby to form an initial digest mass in which acid reacted titanium and iron are principally in the form of water soluble sulfates, baking the digest mass by extraneous heating at temperatures within the range of not less than about 300° C. and not exceeding 500° C. for substantial time interval sufficient to expel substantially all of the free sulfuric acid whereby to form a solid baked cake in which the bulk of the acid reacted titanium is in the form of water insoluble sulfate, treating the baked cake at temperatures not more than about 80° C. with water in quantity to leach out water soluble iron sulfate, separating from the iron sulfate liquor residual solid titanium sulfate compound having ferric sulfate associated therewith, forming an aqueous mixture of said compound, boiling said mixture in the presence of reducing agent in amount sufficient to reduce ferric iron of said compound to the ferrous state whereby to convert titanium to solid titanium-oxygen compound, and separating residual solid titanium-oxygen compound from the liquor.

4. The method for making titanium-oxygen compound which comprises digesting at elevated temperature titaniferous material, containing iron at least about 70% of which is in the ferric state, with sulfuric acid in amount in excess of that needed to convert titanium of said material to the disulfate whereby to form an initial digest mass in which acid reacted titanium and iron are principally in the form of water soluble sulfates, baking the digest mass by extraneous heating at temperatures within the range of not less than about 300° C. and not exceeding 500° C. for substantial time interval sufficient to expel substantially all of the free sulfuric acid whereby to form a solid baked cake in which the bulk of the acid reacted titanium is in the form of water insoluble sulfate, treating the baked cake at temperatures not more than about 80° C. with water in quantity to leach out water soluble iron sulfate, separating from the iron sulfate liquor residual solid titanium sulfate compound having ferric sulfate associated therewith, forming a sulfuric acid liquor aqueous mixture comprising said compound and reducing agent in amount sufficient to reduce ferric iron of said compound to the ferrous state and having an $H_2SO_4$ concentration not in excess of 23%, boiling said liquor, and separating resulting solid titanium-oxygen compound from the liquor.

5. In the manufacture of titanium-oxygen compounds the steps comprising digesting at elevated temperature titaniferous material, containing iron at least about 70% of which is in the ferric state, with sulfuric acid in amount in excess of that needed to convert titanium of said material to the disulfate whereby to form an initial digest mass in which acid reacted titanium and iron are principally in the form of water soluble sulfates, baking the digest mass by extraneous heating at temperatures within the range of not less than about 300° C. and not exceeding 500° C. for substantial time interval sufficient to expel substantially all of the free sulfuric acid whereby to form a solid baked cake in which the bulk of the acid reacted titanium is in the form of water insoluble sulfate.

HENRY F. MERRIAM.
MAXWELL J. BROOKS.